Sept. 25, 1951          W. H. HARSTICK          2,569,166
PRESSURE RESPONSIVE SPEED INDICATOR AND GOVERNOR
Filed Jan. 28, 1948                    3 Sheets-Sheet 1

INVENTOR.
William H. Harstick
BY
Paul O. Pippel
Atty

Sept. 25, 1951 W. H. HARSTICK 2,569,166
PRESSURE RESPONSIVE SPEED INDICATOR AND GOVERNOR
Filed Jan. 28, 1948 3 Sheets-Sheet 2

INVENTOR.
William H. Harstick
BY
Paul O. Pippel
Atty.

Sept. 25, 1951 W. H. HARSTICK 2,569,166
PRESSURE RESPONSIVE SPEED INDICATOR AND GOVERNOR
Filed Jan. 28, 1948 3 Sheets-Sheet 3

INVENTOR.
William H. Harstick
BY Paul O. Pippel
Atty.

Patented Sept. 25, 1951

2,569,166

UNITED STATES PATENT OFFICE 2,569,166

PRESSURE RESPONSIVE SPEED INDICATOR AND GOVERNOR

William H. Harstick, Oak Park, Ill., assignor to International Harvester Company, a corporation of New Jersey Application January 28, 1948, Serial No. 4,755

1 Claim. (Cl. 200—83)

1

This invention relates to a speed governing device and speed indicator for a high-speed electric motor. More specifically, it relates to a speed indicator and governing device for the power unit of a centrifugal separator.

In applicant's invention a high-speed series wound electric motor is directly connected in driving engagement with the cream separating bowl of a centrifugal separator. During the separation of whole milk into its separated constituents, the cream separating bowl is rotated at an approximate speed of 10,000 R. P. M. It is extremely desirable that this speed of rotation remain constant during the separating process in order to secure efficient and rapid separation. Load variations on the bowl and current variations in the motor tend to upset the constant speed of rotation which is desired. It is therefore desirable that a speed governing means be provided which will eliminate erratic rotation of the separating bowl and the motor. A governing means to accomplish this result must be sufficiently sensitive to react to the slightest changes in the rotation of the bowl. It is applicant's prime object to provide a speed governing means of this type.

Before the separating operation begins, the operator must first determine whether or not the separating bowl has attained a sufficiently high speed. It is also extremely desirable therefore that a speed indicating device be provided which will be sufficiently accurate to indicate the speed of rotation of the bowl. In applicant's application Serial No. 678,863, now Patent No. 2,504,261, April 18, 1950, a power washing cream separating bowl is shown. A bowl of this type is required to be rotated at two different speeds. A high speed of rotation is needed for the separation of the whole milk. When the separating operation has been completed, the operator then desires to wash the interior parts of the bowl. To accomplish this it is necessary that the bowl be rotated at a considerably lower speed. In order to accurately determine, therefore, the necessary speeds it is desirable to provide an accurate indicating device which is operative with and by the governing means of the motor. Applicant has provided an indicator and governor which accomplishes these desirable objects.

It is a further object to provide a speed governing device for a high-speed electric motor, said governing device being controllable by a fluid pressure responsive device.

A further object is to provide an indicating and signal device for indicating the speeds of

2 rotation of a cream separating bowl, said device being responsive to a fluid pressure responsive element.

A still further object is to provide a bellows element which is movable in response to variable fluid pressures within a chamber, said bellows element being arranged to control the electric current flow to an electric motor and to actuate a signal device for indicating the speed of the motor.

A still further object is to provide a speed governing device having a fluid reservoir, said reservoir including an impeller and drive shaft and means enclosing said drive shaft within the reservoir.

These and other objects will become more readily apparent upon a reading of the annexed specification when examined in conjunction with the drawings.

In the drawings:

Figure 4 is a view taken along the line 4—4 of Fig. 1.

Figure 1:
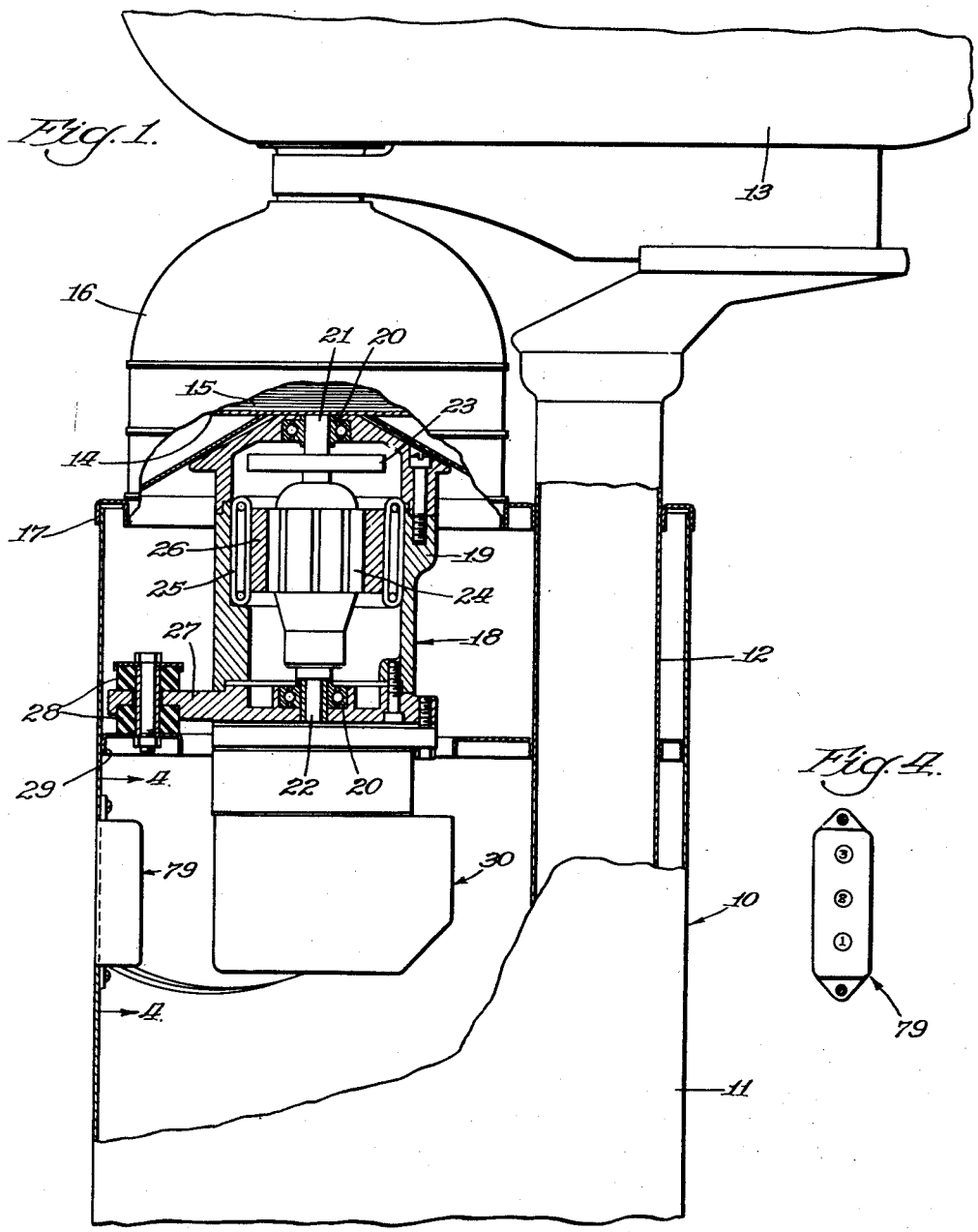
Figure 1 is a side elevational view in partial section showing a centrifugal cream separator and its driving means therefor.

Referring to Figure 1 a centrifugal cream separator is generally indicated by the reference character 10. The cream separator 10 consists of a housing 11 which encloses a supply can support 12 supporting a supply can 13. A cream separating bowl 14 is provided within the centrifugal cream separator 10. The cream separating bowl 14 includes a disk pack, or group of superposed separating disks 15. Enclosing the separating bowl 14 is a tinware construction 16. The tinware construction 16 is supported on a supporting channel 17, in turn supported by the housing 11. An electric motor is generally designated by the reference character 18. The type of motor 18 used for driving the cream separating bowl 14 is a high speed series wound unit enclosed within a housing 19. Upper and lower anti-friction bearings 20 are supported on the housing 19. A driving shaft 21 is journaled on the bearings 20. The upper end of the driving shaft 21 projects inwardly into the cream separating bowl 14 and is suitably fastened thereto for rotation therewith. A driving shaft extension 22 is provided at the lower end of the driving shaft 21. A heat dispelling fan 23 is mounted on the driving shaft 21. The driving shaft 21 also supports for rotation an armature 24 which is rotatable within a series-wound coil 25 and field poles 26. A base extension 27 extends outwardly of the motor 18 and supports the same on shock mounting supports 28 which are secured to a supporting member 29. One or more of the base extensions 27 is connected to the housing 19, only one being shown, however, for the purpose of this disclosure.

Figure 2:
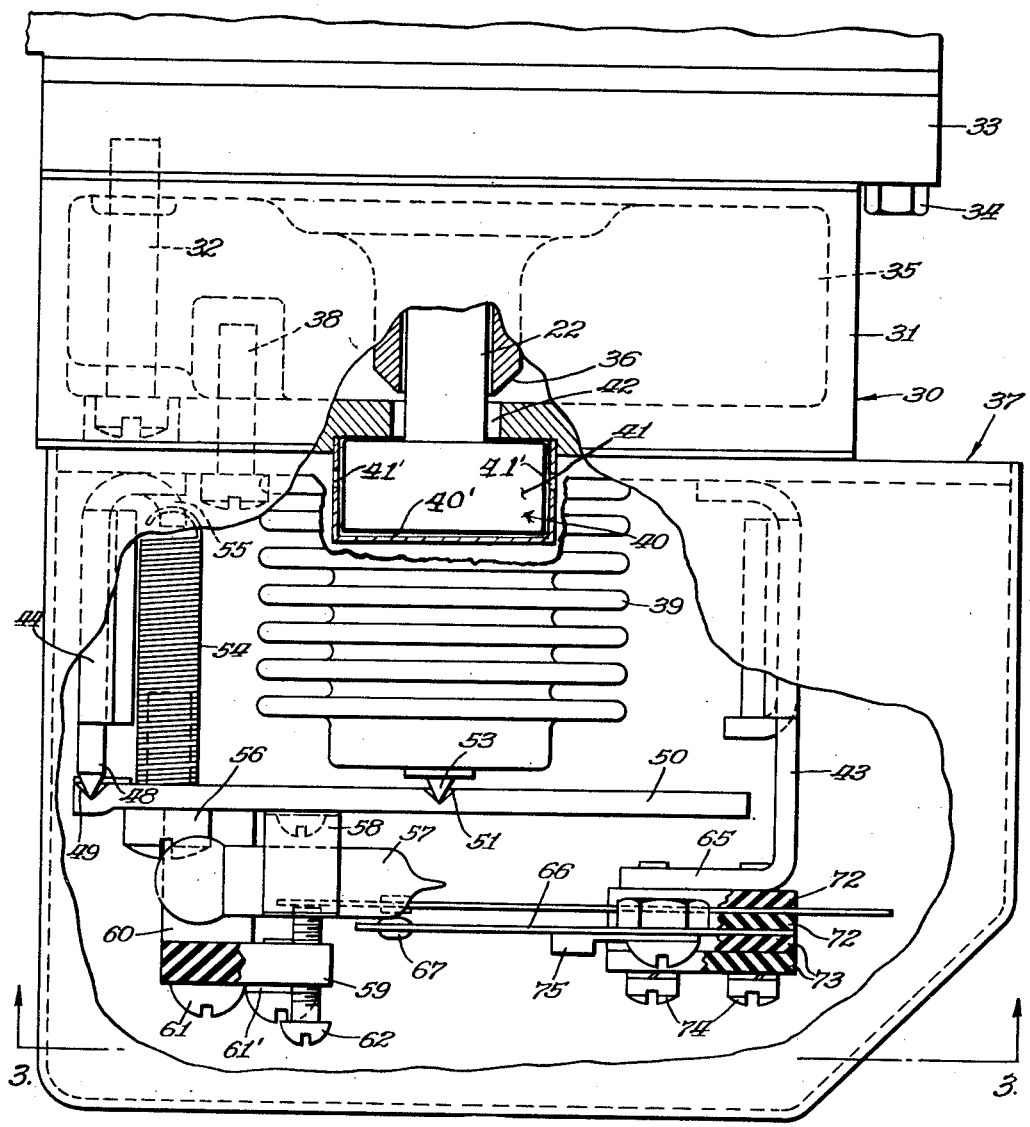
Figure 2 is an elevational view, partially in section, of a speed governing and indicating device for controlling a high speed series wound electric motor.

A speed governing device and speed indicating mechanism is generally indicated by the reference character 30. The speed governing device and speed mechanism 30 includes an upper housing 31 which is rigidly secured by a bolt 32 to a clamping member 33. The clamping member 33, as indicated in Figure 2, is rigidly secured to the lower portion of the electric motor 18 by means of a screw 34. The upper housing 31 has a fluid reservoir 35 therein. The shaft extension 22 projects downwardly through the reservoir 35 and is surrounded by means of a collar or boss extension 36. The outer surface of the shaft extension 22 is removed from the inner surface of the collar 36, since it is not intended that the collar 36 act as a bearing surface.

The lower end of the boss extension 36 ends just slightly above the lower wall of the fluid reservoir 35. The position of the boss extension is important. During shipment of these devices a certain quantity of fluid is present within the reservoir 35. Since the devices may be shipped in an inverted position or may be turned on their sides, the fluid in the reservoir would normally run out past the shaft 22 and into the electric motor. By extending the boss extension to a point near the bottom of the reservoir, the fluid in the reservoir is maintained therein despite the positions the device may be placed in during shipment. Thus the reservoir 35 may be placed on its sides or inverted without fluid escaping. By extending the boss extension in this manner a still further object is secured. It is undesirable to agitate the fluid in the reservoir. Since the boss extension encloses the shaft 22 in this manner the rotating shaft will not agitate the fluid within the reservoir.

A lower housing 37 is rigidly secured to, and in sealing engagement with, the upper housing 31. Several screws 38, only one of which is shown, serve the purpose of clamping the parts together. A fluid pressure responsive element or flexible bellows 39 is provided within the lower housing 37. The bellows 39 includes an inner chamber 40 formed by a housing 40' within which an impeller 41 is arranged to be rotated. The housing includes openings 41' in communication with the interior of the bellows. The impeller 41 is rigidly secured to and rotatable with the shaft extension 22. An enlarged opening 42 places the chamber 40 and the fluid reservoir 35 in communication with one another. This opening is in axial alinement with the collar 36 and the bellows 39.

A pair of spaced brackets 43 and 44 are connected within the housing 37. Screws 45 and 46 respectively connect these brackets 43 and 44 to the cylindrical wall 47 of the housing. The bracket 44 is provided at its lowermost end with a tapering or pointed extension 48. The tapering or pointed extension 48 engages a conical recess 49 formed in one end of a lever arm 50. The lever arm 50 is shaped in the form of a metal plate having diverging sides 50'. A conical recess 51 is provided substantially centrally in the lever 50 and this recess is in mating engagement with a tapering projection 53. The projection 53 and the recess provide a pin point engagement between the lever 50 and the bellows 39. A coil spring 54 is connected at its uppermost end to a loop 55 integral with the bracket 44. The coil spring 54 extends downwardly and is connected to the arm 50 by means of a screw element 56. The spring 54 serves to maintain the lever arm 50 in contact engagement with the bellows element 39. The arm is free to pivot about the tapering end 48 which also has pin-point engagement within the conical recess 49.

Figure 3:
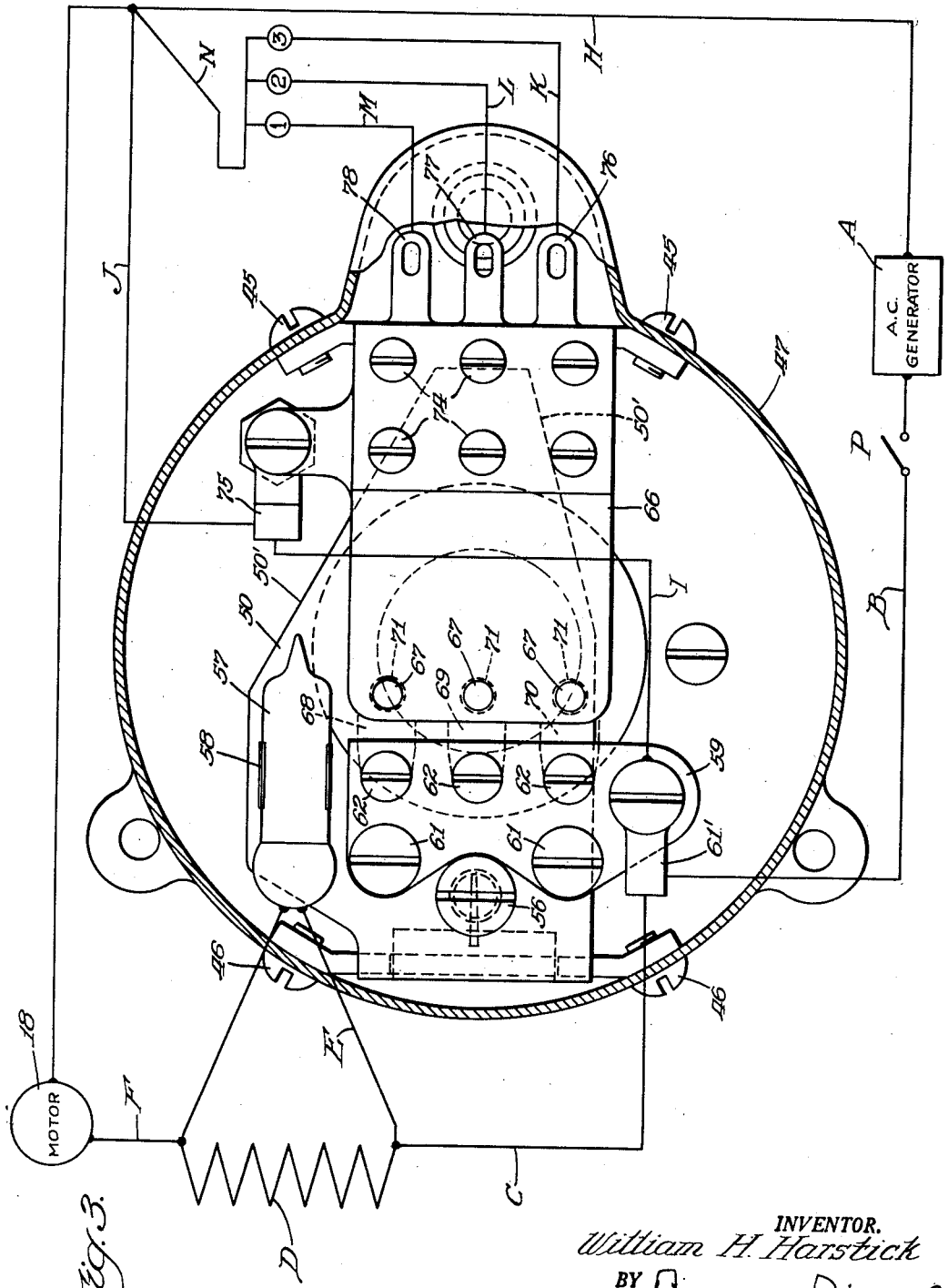
Figure 3 is a sectional view taken along the line 3—3 of Figure 2. This figure also includes a schematic wiring diagram.

A fluid switch 57 filled with a suitable conducting fluid, such as mercury, is connected to the lever arm 50 by means of a bracket 58. An insulating strip 59 is connected to the lever arm 50 by means of a spacer block 60 and a screw 61 extending upwardly to the lever arm. A terminal 61' is also connected to the insulating strip 59. The bracket 43 has a horizontally bent portion 65 on which a contact plate 66 is securely mounted. The contact plate 66 includes contact buttons 67. As best shown in Figure 3, a plurality of spring-like contact arms 68, 69 and 70 also have one of their ends secured to the bracket member 43. The contact arms 68, 69 and 70 have contact tips 71 which may engage the contact button 67 of the contact plate 66. Insulating strips 72 and 73 securely insulate the parts from one another and screws 74 rigidly secure the parts to the brackets 43. Each contact arm 68, 69 and 70 is respectively provided with terminal ends 76, 77 and 78.

As best shown in Figure 1, a signal element 79 is connected within the housing 11. The signal element is visible to the operator as best shown in Figure 4.

As best shown in Figure 3, the wiring circuit for the electric motor includes a source of electricity or electrical generator designated by the letter A. A wire B connects the generator A and the terminal 61'. A wire C is connected to a resistor D and also to a parallel circuit E which in turn is connected to the terminal end of the mercury switch 57. A wire F connects the resistor D and the circuit E to the motor 18. A wire H completes a circuit from the motor 18 to the generator A. A wire I connects the terminal 61' and the terminal 75. A wire J and terminal 75 completes the circuit to the wire H. Wires, K, L and M are respectively connected to the terminal ends 76, 77 and 78. The wires K, L and M are connected, in turn, to signals identified by the reference characters 1, 2 and 3. A wire N from the signals 1, 2 and 3 completes the circuit and is connected to the wire H. A main switch P is provided for controlling the flow of electricity from the generator A.

In operation the switch P is closed and electricity flows through the wires B and C, through the resistor D, through the parallel circuit E and into the motor 18, whereupon the motor operates to rotate the separating bowl 14. The mercury switch 57 is now in the position indicated in Figure 2. The motor 18 increases in speed until a separating speed of approximately 10,000 R. P. M. is reached. It is desirable that the speed of rotation remain as constant as possible. The impeller 41 (which is rotating at the same speed as the separating bowl) is rotating within a body of fluid within the chamber 40. The reservoir 35 supplies fluid to the chamber 40 through the opening 42. As the speed of rotation within the motor increases and the fluid pressure within the chamber 40 increases, fluid pressure is transmitted through the openings 41' to the bellows element 39 which therefore expands. As the bellows element 39 expands, the lever arm 50 is moved downwardly in a clockwise direction about the pointed end 48 of the bracket 44. As the bellows element 39 expands further, the mercury within the mercury switch 57 flows rearwardly in its tube and the circuit is broken between wires E and F. The only electrical circuit flow to the motor 18 is now through the resistor D and the speed of the motor is therefore retarded. In this manner the motor speed can be accurately regulated and the governor device is sufficiently sensitive to slight changes in fluid pressures within the bellows element 39. As soon as the speed of the separating bowl has been sufficiently retarded, the bellows 39 contracts due, to the decrease of fluid pressure within the chamber 40. As the bellows contracts the spring 54 pivots the lever arm 50 in a counterclockwise manner, thereby bringing the same back to the position indicated in Figure 2. The contraction and the expansion of the bellows element 39 thereby controls the flow of electrical energy to the motor 18.

The spring-like contact arms 68, 69 and 70 normally tend to press downwardly in the direction of the contact plate 66. When the desired high speed of rotation of the bowl has been reached, the lever arm 50 is in its downward position with the bellows element in its expanded position. At this point the contact tips 71 are in contact with the contact elements 67 and the signal elements 1, 2 and 3 indicate that the high speed of rotation or separating speed has been reached. The signal elements 1, 2 and 3 may be ordinary lights which may be energized by means of current flowing through the wires K, L and M. When the speed of rotation of the separating bowl and motor decreases, the bellows element 39 contracts and the lever arm 50 is moved in a counterclockwise direction. The set-screws 62 are also moved since they are connected to the lever arm 50 by means of the insulating strip 59. The set-screws are adjusted in staggered height relation, and as the lever arm moves in a counterclockwise direction, first one and then the other set-screw will engage a respective contact arm 69, lifting the same from the contact plate 66, whereby the contact between each contact element 67 and the contact tip 71 will be broken in consecutive order. As the contact is thus broken, the circuits K, L and M are also broken and the signals 1, 2 and 3 are turned off.

During the high separating speed of approximately 10,000 R. P. M., all three signals are energized. As the speed of operation is retarded and the speed of rotation of the impeller is decreased, the lever arm 50 moves and the contacts leading to the signals are consecutively broken. The time or speed intervals at which the signals can be turned on or off can be easily adjusted by manipulating the set-screws 62 to a predetermined position with respect to the contact arms 68, 69 and 70. If the indicating device is utilized with a power washing cream separator, it may be desired to wash the bowl at a speed of approximately 6000 R. P. M. The speed of the bowl may be lowered by simply directing a large quantity of washing liquid into the bowl, whereupon the rotation of the bowl will promptly decrease to the desired washing speed. By adjusting one of the set-screws 62, one of the signals can be so regulated that it will flash off when this speed of rotation is reached. With a construction of this type, it, of course, can readily be appreciated that any number of signal elements can be utilized.

It can thus be seen that applicant has fully achieved the objects of the invention and that he has provided a novel and effective speed governing and speed indicating means for the high speed electric motor of a centrifugal cream separator. By utilizing a fluid pressure responsive element, applicant is able to exercise sensitive control over the electrical power unit. It is to be understood that changes and modifications may be made which do not depart from the spirit of the invention, as disclosed, nor the scope thereof as defined in the appended claim.

What is claimed is:

A speed governing device for controlling the speed of an electric motor having a rotatable shaft positioned for rotation about a vertical axis, the shaft having an extension projecting downwardly from the motor comprising, a first housing adapted to be connected to the underneath side of the electric motor, said first housing providing a liquid reservoir substantially separate of the motor to which it may be attached and substantially enclosed with respect to the atmosphere, said first housing having upper and lower substantially centrally disposed openings in registry, the shaft extension projecting through said openings, the lower of said openings being of a substantially larger diameter than the diameter of said shaft to permit the free flow of liquid through said lower opening from the reservoir, an impeller adapted to be connected to the lower end of the shaft extension below the first housing, a second housing connected to the first housing, said second housing including a chamber having side walls and a lower wall positioned in close adjacent relation to said impeller, said second housing having a plurality of openings, a pressure responsive device positioned below the first housing, said device including an expansible and contractible bellows element disposed over the second chamber, said bellows element being in communication with said chamber and with said liquid reservoir, said bellows being movable in response to liquid pressures developed in said chamber by the rotation of said impeller, and switch means for controlling the flow of electrical current to the electric motor, the switch means including electrical contacts adapted to be opened and closed in response to the movement of said bellows element.

WILLIAM H. HARSTICK.

REFERENCES CITED

The following references are of record in the file of this patent:

UNITED STATES PATENTS

| Number | Name | Date |
| --- | --- | --- |
| 738,871 | Alexander | Sept. 15, 1903 |
| 910,661 | Geisenhoner | Jan. 26, 1909 |
| 1,494,189 | Russell et al. | May 13, 1924 |
| 1,807,280 | Carpenter | May 26, 1931 |
| 1,938,679 | Anderson | Dec. 12, 1933 |
| 1,946,165 | Irwin | Feb. 6, 1934 |
| 1,965,543 | Eggleston et al. | July 3, 1934 |
| 2,215,242 | Jensen | Sept. 17, 1940 |
| 2,220,763 | Hemphill | Nov. 5, 1940 |
| 2,276,787 | Moore | Mar. 17, 1942 |
| 2,297,001 | La Bour | Sept. 29, 1942 |
| 2,469,374 | Finney | May 10, 1949 |